United States Patent [19]

Starr

[11] Patent Number: 5,221,969
[45] Date of Patent: Jun. 22, 1993

[54] APPARATUS FOR ROUTING DIGITAL VIDEO IMAGE DATA

[75] Inventor: Matthew R. Starr, Ware, United Kingdom

[73] Assignee: Rank Cintel Limited, England

[21] Appl. No.: 719,336

[22] Filed: Jun. 21, 1991

[30] Foreign Application Priority Data

Jun. 22, 1990 [AU] Australia .................... PK0793

[51] Int. Cl.$^5$ .................................. H04N 5/262
[52] U.S. Cl. ............................. 358/181; 358/160; 358/183; 340/825.03
[58] Field of Search ............... 358/160, 181, 182, 183, 358/22; 340/723, 717, 825.12, 825.13, 825.15, 825.03, 825.04; 370/68, 58.1

[56] References Cited

U.S. PATENT DOCUMENTS

| | | | |
|---|---|---|---|
| 4,599,721 | 7/1986 | Murray | 370/112 |
| 4,626,912 | 12/1986 | Wilkinson | 358/160 |
| 4,716,460 | 12/1987 | Benson et al. | 358/160 |
| 4,974,083 | 11/1990 | Bloomfield et al. | 358/160 |
| 5,070,449 | 12/1991 | Dawson et al. | 340/825.03 |

OTHER PUBLICATIONS

Savant et al., *Electronic Circuit Design*, 1987, p. 740.
Mano, *Digital Logic and Computer Design*, 1979, pp. 175-177.

Primary Examiner—Victor R. Kostak
Assistant Examiner—Glenton B. Burgess
Attorney, Agent, or Firm—Ostrolenk, Faber, Gerb & Soffen

[57] ABSTRACT

A plurality n of digital video data streams are individually latched into respective input latches $11_1$ to $11_n$ by a first clock signal LPClk. Two out of n select signals are applied by a selector 16 to enable inputs 14 of the input latches $11_1$ to $11_n$ to select alternate half clock cycles of latched video data and to output such video data to a common bus 19 which supplies two output latches 20 and 21 latched respectively by an antiphase clock signal FLPClk and the signal LPClk so that one of the selected streams is latched into latch 20 as foreground and the other into latch 21 as background. Further latches 31 and 32, and 33 and 34, may be employed to bring the foreground and background streams into relative synchronism.

6 Claims, 4 Drawing Sheets

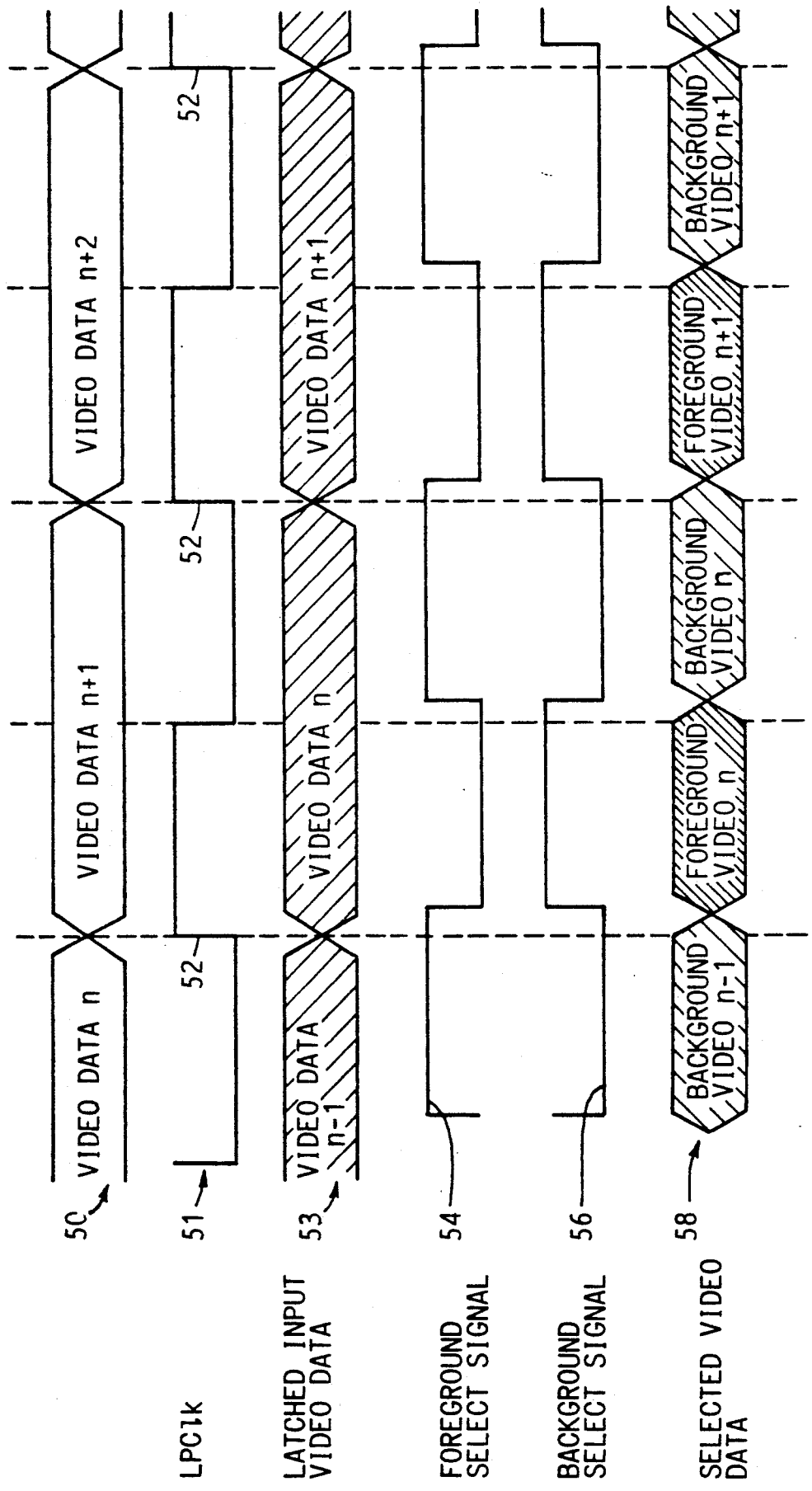

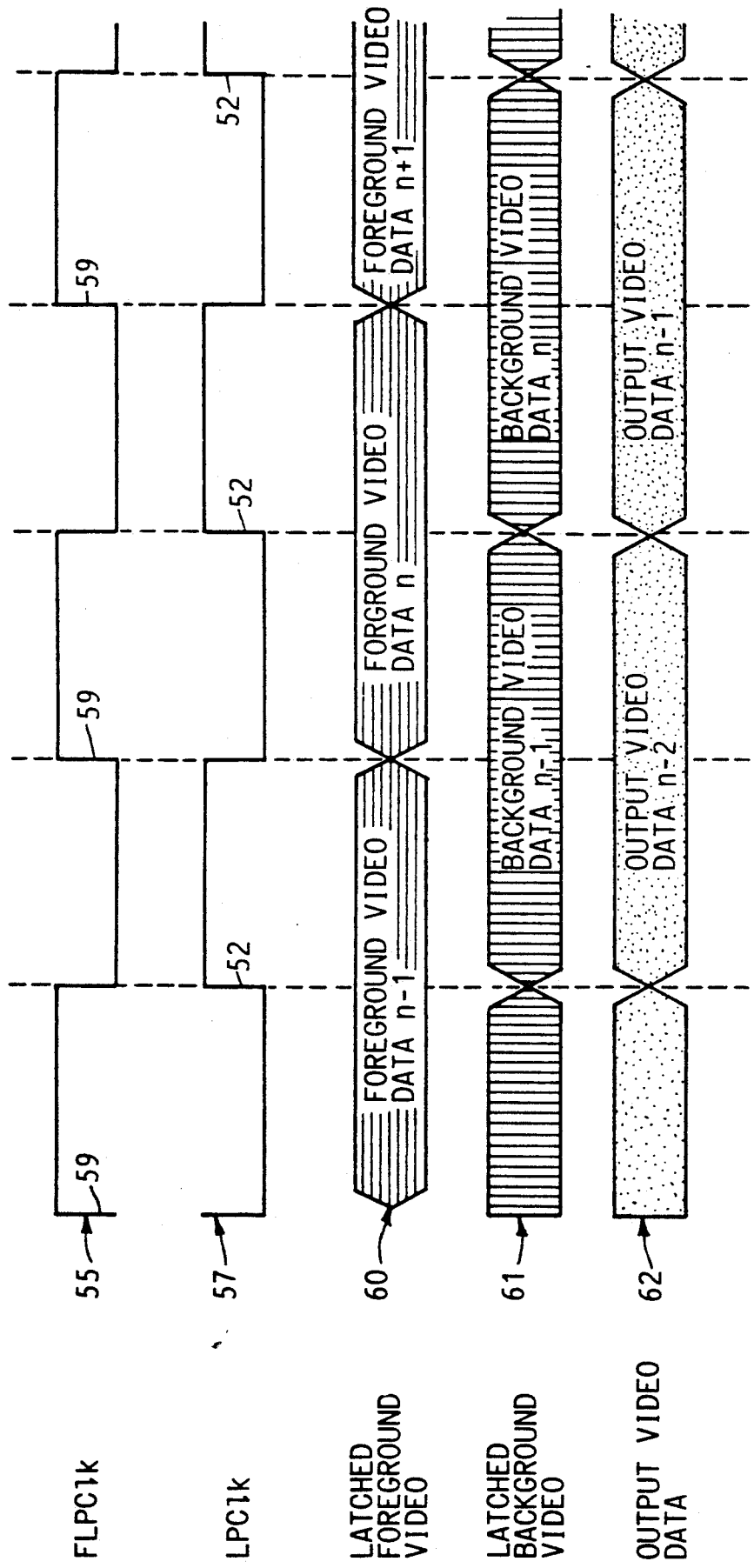

APPARATUS FOR ROUTING DIGITAL VIDEO IMAGE DATA

FIELD OF THE INVENTION

This invention relates to apparatus for routing digital video data from any pair of a plurality of sources of digital video data to a pair of destinations.

SUMMARY OF THE INVENTION

According to the present invention there is provided apparatus for routing digital video data from selectable ones of a plurality of digital video data inputs to either or both of two digital video data outputs, the apparatus comprising a respective input latch so connected to each input as to be capable of selectively latching digital video data at the respective input, a digital video data bus coupling the outputs of the input latches to two output latches, each output latch being coupled to a respective one of the two digital video data outputs, a source of clock signals coupled to the input and output latches to supply clock signals to the input and output latches, and means for supplying select signals to selectively enable respective ones of the input latches.

In a preferred embodiment of the invention, each of the said output latches is coupled to the respective digital video data output by a series of further latches, and the said output latches and further latches are supplied with clock signals by the clock signal source to synchronise the digital video data signals appearing in operation at the two digital video data outputs. Advantageously each said latch comprises an octal circuit of D-type edge triggered flip-flops, and the select signals are supplied to enable inputs of the input latches.

BRIEF DESCRIPTION OF THE DRAWINGS

The invention will now be described by way of example with reference to the accompanying drawings in which:

FIGS. 3A and 3B are diagrams illustrating the timing of signals used in the embodiment of FIG. 2.

DETAILED DESCRIPTION

Figure 1:
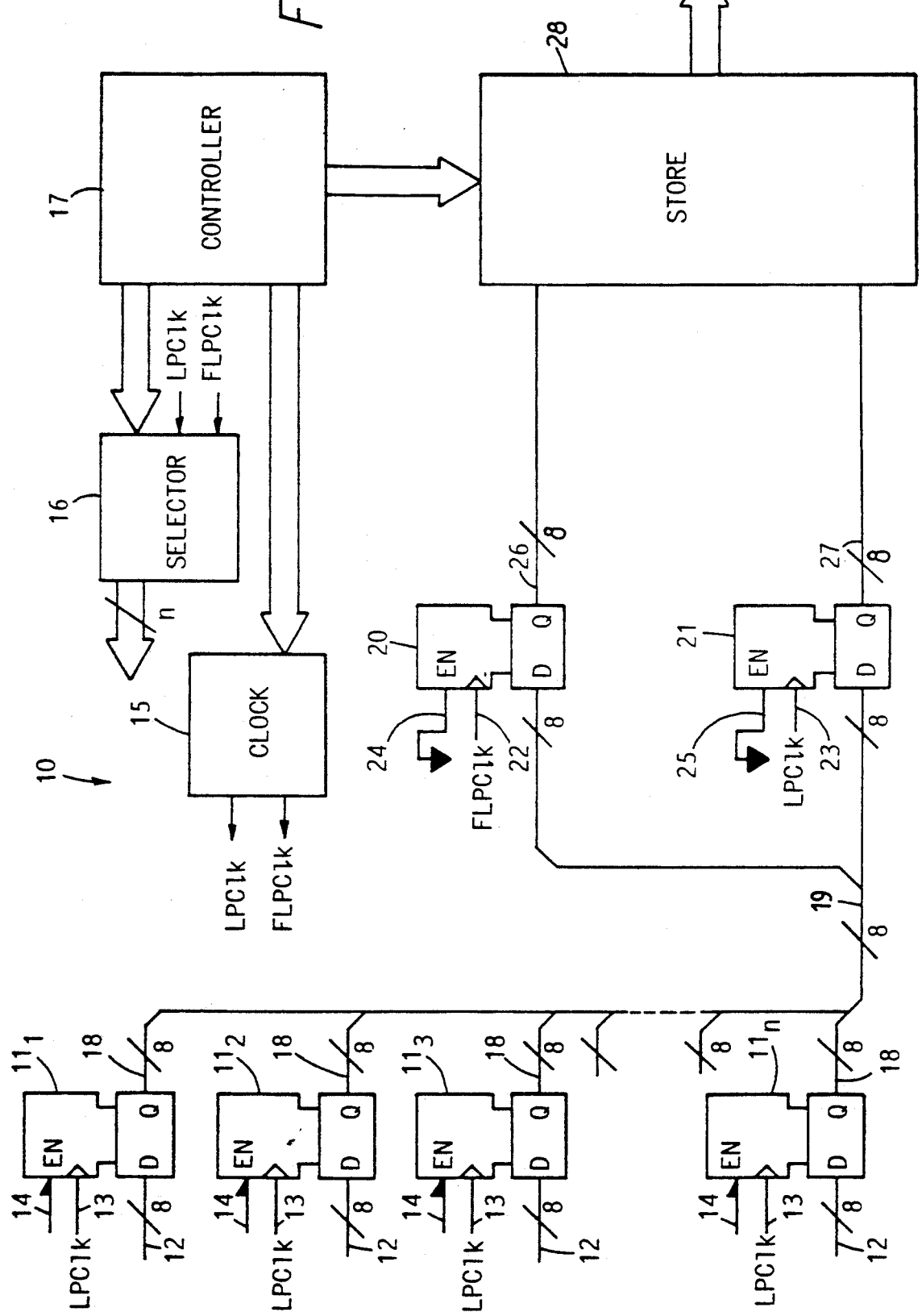
FIG. 1 is a schematic diagram of a first embodiment of the invention.

In FIG. 1 there is shown a first embodiment of the invention which is an apparatus 10 for selecting two input digital video data streams from a large plurality, n, of digital video data streams for use as foreground and background signals. Each input video stream is in eight bit form and is supplied as input to a respective one of a corresponding plurality of input latches $11_1$ to $11_n$. Each input latch has, in addition to its eight bit input port 12, a clock input 13 and an enable input 14. A clock signal LPClk is supplied to the clock inputs 13 by a clock circuit 15, and select signals are supplied to the enable inputs 14 by a selector circuit 16. The outputs from the clock circuit 15 and the selector circuit 16 are controlled by a controller 17.

Each input latch has an eight bit output 18 which is connected to an eight bit common bus 19 that couples the outputs 18 to two output latches 20 and 21 having clock inputs 22 and 23 and enable inputs 24 and 25 respectively. The enable inputs 24 and 25 are grounded to keep the output latches 20 and 21 enabled. The latches 20 and 21 have respective eight bit outputs 26 and 27 that are connected to a store 28. Operation of the store 28 is controlled by the controller 17.

In this embodiment, the latches $11_1$ to $11_n$ and 20 and 21 are octal edge-triggered D-type flip-flop circuits that are enabled when the enable input 14 or 24 or 25 receives a low input, and that provide tri-state outputs, so that their outputs are high impedance when the enable signal is high. Data is latched into these latches on the rising edge of a clock pulse and is stored in the latch whether the enable signal is high or low. The stored content of the latch only appears at its output 18 or 26 or 27 when the enable signal is low.

The clock circuit 15 produces two clock signals: LPClk and FLPClk, which are in anti-phase with each other. FLPClk is supplied to the output latch 20, and LPClk is supplied to the output latch 21.

The select signals have the same shape and repetition rate as the clock signals but are slightly later, i.e. delayed, relative to the clock signals, or are set high.

The digital video data streams input to the latches $11_1$ to $11_n$ have a bit rate of $8 \times 13.5$ megabits per second, so that the data presented to each latch changes at 13.5 MHz. The clock signals and selector signals, which are of the same shape as the clock signals, therefore have a repetition rate of 13.5 MHz.

The controller 17, which may be a host processor, applies a command to the selector 16 which decodes the command to select the clock signals LPClk and FLPClk for delaying and outputting as a selected two of the enable signals, and to apply a high signal to the enable inputs 14 of all the other input latches.

The clock signal LPClk is substantially in synchronism with the input digital video data streams, so that each input latch $11_1$ to $11_n$, latches in the data of its respective stream. If the enable signal is high at an input latch, no data appears at its output. However, data appears at substantially alternate half clock cycles at the outputs of those two input latches that receive the delayed LPClk and FLPClk signals as enable signals, so that a data stream is coupled through the bus 19 at 27 MHz and thus supplied to the data inputs of the output latches 20 and 21.

The alternate half clock cycles of data are alternately latched in by the output latches 20 and 21 since they are respectively clocked by the anti-phase clock signals FLPClk and LPClk, and separate data streams at the clock rate 13.5 MHz appear at the data outputs 26 and 27 of the latches 20 and 21.

The store 28 is so controlled by the controller 17 that the two separate data streams are stored in respective stacks organised in the store, from which the data can be accessed as required for further processing or utilization as desired.

The selector circuit 16 can be formed from, for example, decoding and delay logic or a parallel logic array, as will be apparent to those skilled in the art.

The clock circuit 15 can be any suitable logic circuit providing anti-phase outputs and drivable by a clock signal, which is divided if necessary, from the controller 17. Such arrangements will be obvious to those skilled in the art.

Figure 2:
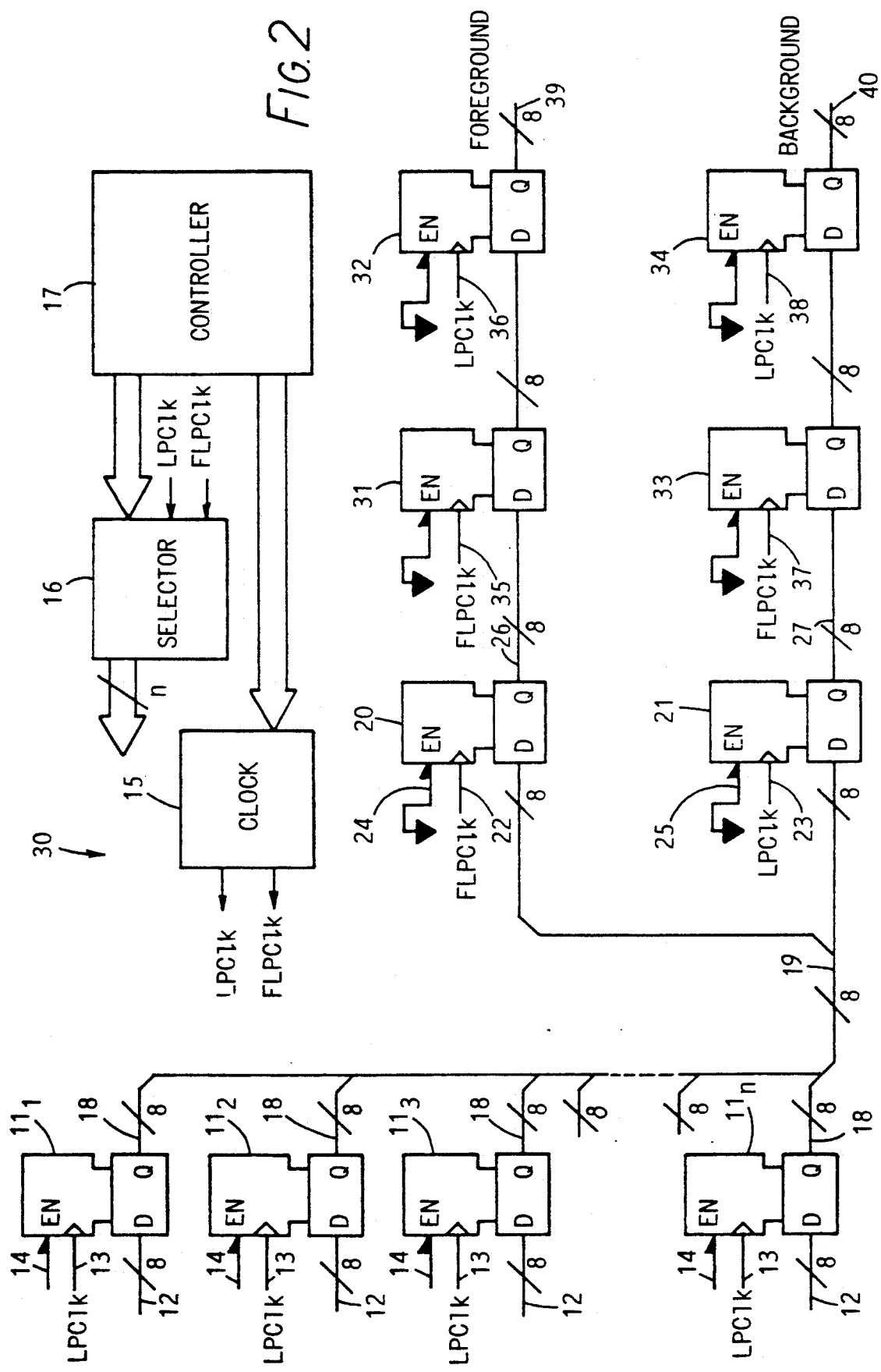
FIG. 2 is a schematic diagram of a second embodiment of the invention.

FIG. 2 shows a further preferred embodiment 30 similar to that of FIG. 1 but having, instead of the store 28, two further latches 31 and 32 coupled in series to the output 26 of the output latch 20, and two further latches 33 and 34 coupled in series to the output 27 of the output latch 21. The remainder of the apparatus of FIG. 2 is the same as that of FIG. 1 as indicated by the use of the same reference numerals. The enable inputs of the further latches 31 to 34 are grounded as are the enable inputs 24 and 25. The clock inputs 35 and 36 of the latches 31 and 32 receive the clock signals FLClk and LPClk respectively, and the clock inputs 37 and 38 of the latches 33 and 34 likewise receive the clock signals FLPClk and LPClk respectively. As a result, the digital video data streams which appear at the respective data outputs 39 and 40 of the latches 32 and 34 are in synchronism in that they have the same relative timing relationship to each other as they had when applied to the respective data inputs 12 of the respective input latches $11_i$, $11_j$. This will now be explained with reference to FIGS. 3A and 3B which illustrate the timing relationships between input digital video data streams, the clock signals LPClk and FLPClk, the two select signals which are delayed versions of the two clock signals, and the various data streams at points in the apparatus of FIG. 2 up to the destination outputs 39 and 40.

In FIG. 3A at 50, input video data n, n+1, and n+2 at three consecutive clock cycles are represented. Such data, different in content, is considered applied to the data inputs 12 of the input latches $11_l$ to $11_n$. A waveform 51 illustrates the clock signal LPClk that latches this data into the input latches $11_l$ to $11_n$ at each rising edge 52. The latched data stored in an input latch is illustrated at 53, and can be seen to be effectively one clock period delayed by the latching. All but two of the input latches have high signals applied to their enable inputs 14 and therefore provide no data output. One of the other two input latches has a foreground select signal 54, which is a delayed version of the FLPClk clock signal, illustrated at 55 in FIG. 3B, applied to its enable input 14, and the other of these two latches has a background select signal 56, which is a delayed version of the LPClk clock signal, illustrated at 57 in FIG. 3B, applied to its enable input 14. Consequently, on the bus 19, video data from the latch enabled by the foreground select signal is interleaved with video data from the latch enabled by the background select signal, such data changing over at every half clock period, slightly delayed relative to LPClk, as illustrated at 58.

Since the rising edges 59 of the clock signal FLPClk applied to the output latch 20 occur during the presence of video data selected by the foreground select signal, only foreground video data is latched into the latch 20. Similarly, only background video data is latched into the output latch 21 since its clock signal rising edges 52 occur during the presence of background select signal selected data on the bus 19. However, as can be seen from the representations of the latched foreground video data 60 in the latch 20 and the latched background video data 61 in the latch 21, these two streams are half a clock period out of synchronism relative to one another. As is well known, a single D-type flip-flop delays data by one clock period. However, although the latch 31 delays the data from output latch 20 by one clock period, the final latch 32 only introduces a further half clock period of delay since the rising edge 52 of LPClk occurs half a clock period after the data is latched into the middle latch 31. In the case of the latches 33 and 34, the clock signal FLPClk latches the data from the latch 21 into the latch 33 half a clock period after it appears at the output of the latch 21, and the clock signal LPClk latches the data from the latch 33 into the latch 34 half a clock period after it appears at the output of the latch 33. Thus the latches 31 and 32 introduce a delay of one and a half clock periods, whereas the latches 33 and 34 introduce a delay of only one clock period. As a result, the output video data at the data outputs of the latches 32 and 34 are in relative synchronism, as can be seen at 62 which represents both output data streams at the destination outputs 39 and 40.

I claim:

1. Apparatus for routing digital video image data from selectable ones of a plurality of digital video image data inputs to either or both of two digital video image data outputs, the apparatus comprising:

a respective input latch connected to each of said digital video image data inputs for selectively latching digital video image data at the respective image data input, a common digital video image data bus coupling the image data outputs of the input latches to two output latches, each output latch being coupled to a respective one of the two digital video image data outputs, a source of clock signals coupled to the input and output latches to supply clock signals to the input and output latches for selectively latching digital video image data present at said digital video image data inputs into said input latches and for selectively latching digital video image data present on said common video image data bus into said output latches, and means for supplying select signals to selectively enable respective image data outputs of respective ones of the input latches so as to provide interleaved video image data from said enabled image data outputs on said common digital video image data bus.

2. Apparatus according to claim 1, wherein each of said output latches is coupled to the respective digital video image data output by a series of further latches, and said output latches and further latches are supplied with clock signals by the clock signal source to synchronise the digital video image data signals appearing at the two digital video image data outputs.

3. Apparatus according to claim 1, wherein the output latches are coupled through said digital video image data outputs to image data storage means for receiving digital video image data in a respective stack from each output latch.

4. Apparatus according to claim 1, wherein each said latch comprises an octal circuit of D-type edge triggered flip-flops, and the select signals are supplied to respective enable inputs of each input latch.

5. Apparatus according to claim 2, wherein each said latch comprises an octal circuit of D-type edge triggered flip-flops, and the select signals are supplied to respective enable inputs of each input latch.

6. Apparatus according to claim 3, wherein each said latch comprises an octal circuit of D-type edge triggered flip-flops, and the select signals are supplied to respective enable inputs of each input latch.

* * * * *